(12) United States Patent
Chai et al.

(10) Patent No.: US 8,035,342 B2
(45) Date of Patent: Oct. 11, 2011

(54) INTEGRATED POWER ADAPTER FOR A LAPTOP

(75) Inventors: Haixin Chai, Beijing (CN); Philip J. Jakes, Durham, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 636 days.

(21) Appl. No.: 12/059,339

(22) Filed: Mar. 31, 2008

(65) Prior Publication Data

US 2009/0243542 A1 Oct. 1, 2009

(51) Int. Cl.
*H02J 7/00* (2006.01)

(52) U.S. Cl. .................. 320/112; 320/114; 307/150

(58) Field of Classification Search ............ 320/112, 320/114; 307/150
See application file for complete search history.

(56) References Cited

U.S. PATENT DOCUMENTS

| | | | | |
|---|---|---|---|---|
| 5,955,797 | A * | 9/1999 | Kim | 307/150 |
| 6,366,935 | B2 * | 4/2002 | Hawkins et al. | 708/100 |
| 7,089,291 | B1 * | 8/2006 | Philyaw | 709/217 |
| 7,734,688 | B2 * | 6/2010 | Langdon | 709/203 |
| 2004/0264181 | A1 * | 12/2004 | Woolfson | 362/157 |
| 2008/0315831 | A1 * | 12/2008 | Li et al. | 320/106 |

* cited by examiner

*Primary Examiner* — M'baye Diao
(74) *Attorney, Agent, or Firm* — Ference & Associates LLC

(57) ABSTRACT

A power pack arrangement for a laptop computer, wherein an AC/DC adapter is integrated with a battery pack to form one cohesive unit freely insertable into and removable from a laptop computer housing.

13 Claims, 3 Drawing Sheets

INTEGRATED POWER ADAPTER FOR A LAPTOP

FIELD OF THE INVENTION

The present invention relates generally to power sources for laptop or notebook computers.

BACKGROUND OF THE INVENTION

Laptop computers have long presented users with a tradeoff whereby significantly long battery life is essentially sacrificed for convenience and weight. Generally, laptop (or notebook) computers conventionally involve an AC/DC adapter that extends from a plug (for plugging into a wall outlet) to a "brick", and then another plug from the brick to a wire which leads to another plug or adapter for insertion into the laptop/notebook. Power from the wall outlet then goes to the system and/or battery.

SUMMARY OF THE INVENTION

Broadly contemplated herein, in accordance with at least one presently preferred embodiment of the present invention, is an integration of the aforementioned brick with the battery.

In summary, one aspect of the invention provides an apparatus comprising: a main housing; a main memory disposed within the main housing; a system processor disposed within the main housing; a power pack for providing power to the main memory and system processor; the power pack being selectively removable from and integrable with the main housing; the power pack comprising: a power pack housing; a battery pack; and an AC/DC adapter; the battery pack and the AC/DC adapter both being housed within the power pack housing.

Furthermore, an additional aspect of the invention provides an apparatus comprising: a power pack for providing power to a laptop computer; the power pack being selectively removable from and integrable with a laptop computer housing; the power pack comprising: a power pack housing; a battery pack; and an AC/DC adapter; the battery pack and the AC/DC adapter both being housed within the power pack housing.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
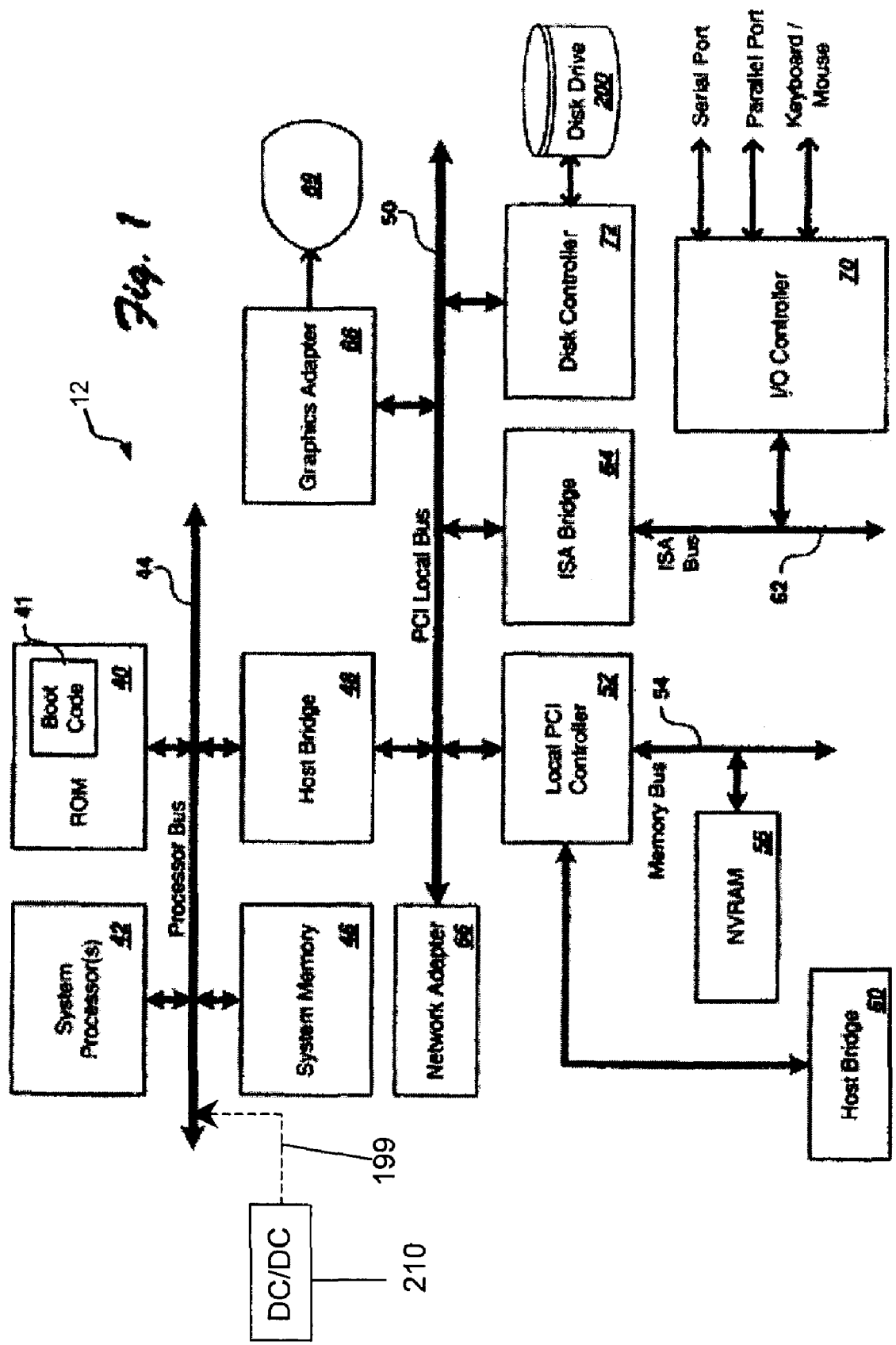
FIG. 1 schematically illustrates a computer system.
Figure 2:
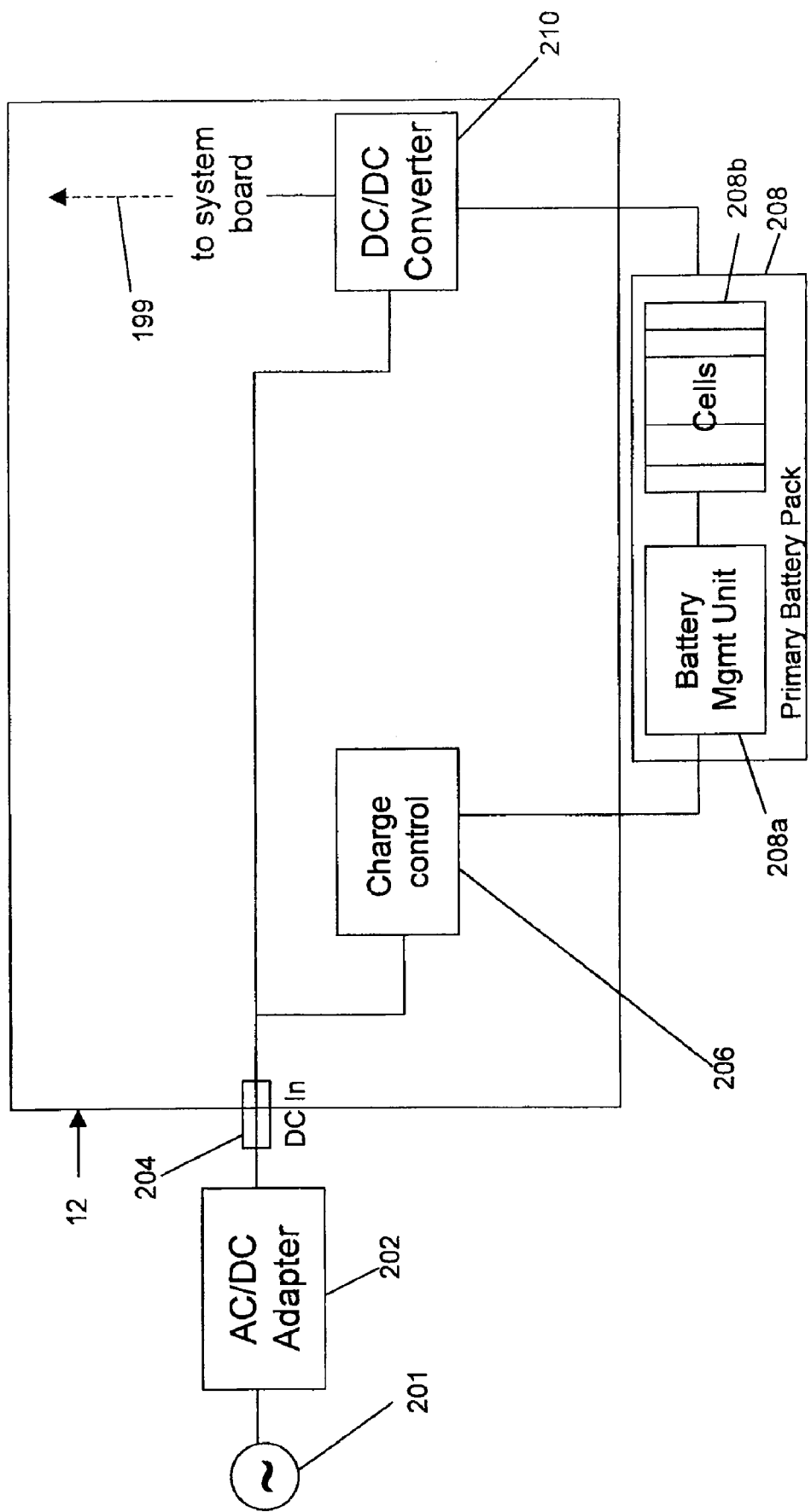
FIG. 2 schematically illustrates a computer system with a conventional battery and brick arrangement.
Figure 3:
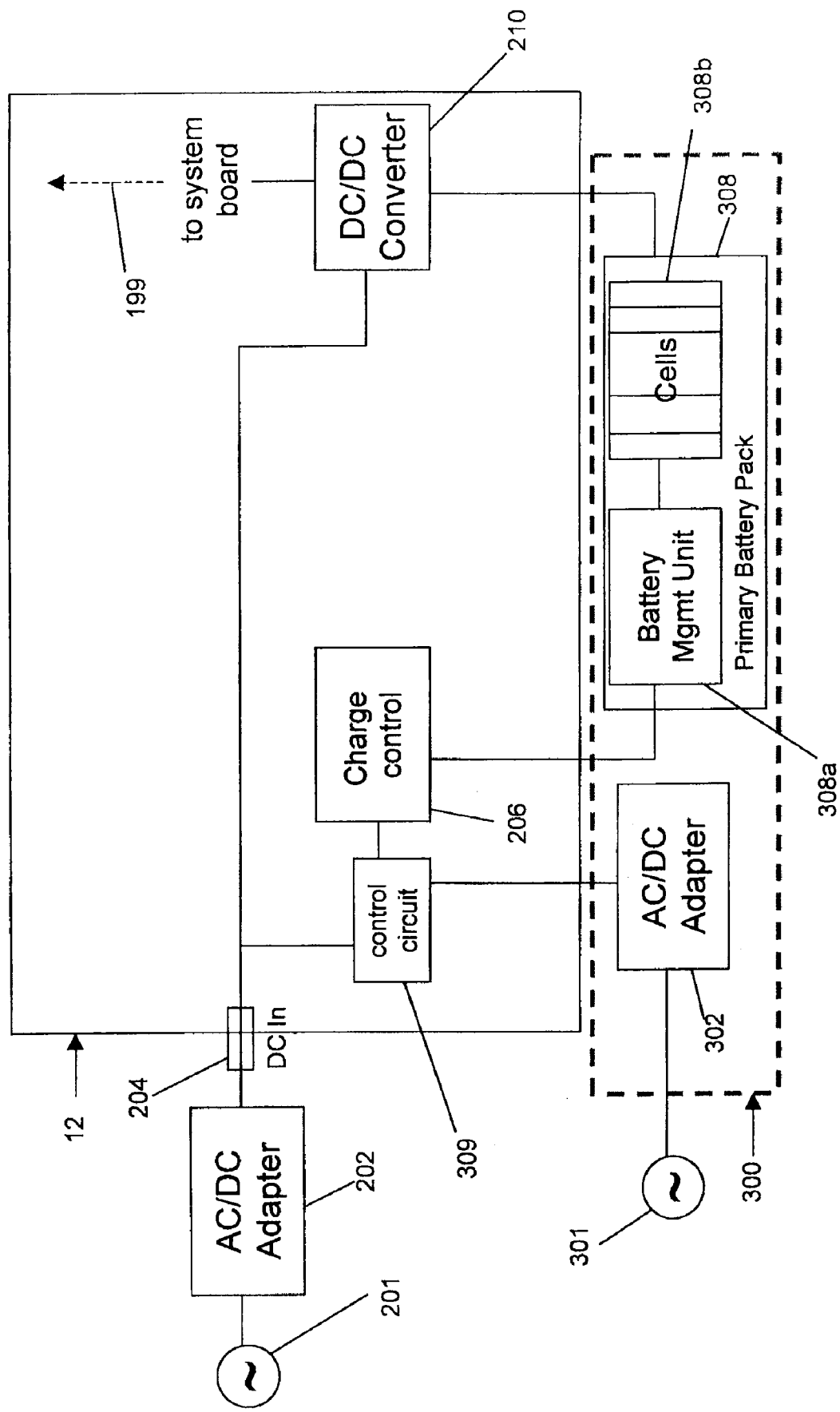
FIG. 3 schematically illustrates a computer system with an integrated power adapter arrangement.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Further illustrated in FIG. 1 is a DC/DC converter 210 which connects, via a connection 209, to the general system 12 at, e.g., processor bus 44. DC/DC converter 210 serves to transmit to system 12 necessary power for powering the system 12 and functions in a manner that will be better understood herebelow.

FIG. 2 schematically illustrates a computer system 12 with a conventional battery and brick arrangement. As shown, a wall outlet 201 can accommodate a plug (not shown in detail) extending from a wire which itself leads to an AC/DC adapter, or "brick", 202. In turn, a wire from here typically can be plugged into a DC input or jack 204. Accordingly, this normally constitutes one distinct system arrangement for powering a computer and (as is well known) recharging a battery pack.

For its part, a primary battery pack 208 is typically freely integrable into, and removable from, a system 12; here, it is shown separately from system 12 merely for the purpose of clearer illustration. Typically, battery pack 208 will include a battery management unit 208*a* and battery cells 208*b*, wherein the management unit 208*a*, as is very well known, manages the charge provide to and from cells 208*b* so as to facilitate, respectively, recharging of the cells 208*b* and powering of the system 12.

Brick 202 and battery pack 208, for their part, both feed into a DC/DC converter 210 as is well-known, and this in turn serves to power the system 12 (via connection 199). Further, a charge control arrangement 206 is typically included to facilitate the charging of battery cells 208*b* by the DC power source (which includes adapter or brick 202). Generally, charge control arrangement 206 will communicate with the battery management unit 208*a* so as to ascertain the state of battery cells 208*b* and to determine the level of current (originating here from AC/DC adapter 202) needed to be provided to cells 208*b* by way of recharging, or continuing to recharge, the cells 208*b*.

In accordance with a presently preferred embodiment of the present invention, FIG. 3 schematically illustrates a computer system with an integrated power adapter arrangement/power pack 300. As shown, the integrated adapter 300 preferably includes not only a battery pack 308 but also an AC/DC adapter 302, itself connectable with an AC power source (e.g., wall outlet) at 301. This may be regarded, to facilitate discussion, as a "secondary" AC/DC adapter (302), with the AC/DC adapter 202 being a "primary" adapter.

Preferably, secondary adapter 302 may connect into system 12 via essentially any suitable manner. Effectively, the integrated adapter 300 will have a wire leading from it to connect into wall outlet (or other source) 301. A plug can thus essentially plug in to the housing of integrated adapter 300 much the same way that a plug normally plugs into a "brick" (e.g., into primary adapter 208). However, it will now be appreciated that the integrated adapter 300, with its own housing containing secondary AC/DC adapter 302 and battery pack 208 simultaneously, will itself easily be integrable into the laptop/notebook housing of system 12 in essentially the same easily insertable and removable manner that a conventional battery pack (see FIG. 2) would be integrable into a laptop/notebook housing.

As shown, secondary AC/DC adapter 302 preferably leads towards the charge control arrangement 206. However, in view of complications that might otherwise arise from having two "competing" external power sources entering the system 12, a control circuit 309 can be positioned so as to receive leads both from primary AC/DC adapter 202 and secondary AC/DC adapter 302, and then only permit one AC/DC adapter at a time to power the system. Preferably, if the primary AC/DC adapter 202 is not plugged in, then the secondary AC/DC adapter 302 may provide power to system 12, whereas if primary AC/DC adapter 202 is indeed plugged in then solely the primary adapter 202, and not the secondary adapter 302, need be enabled.

For its part, charge control arrangement 206 will act with either of the primary adapter 202 or secondary adapter 302 (whichever is active) in a manner similar to that as described above with regard to FIG. 2.

It should be appreciated from the foregoing that an arrangement in accordance with at least one presently preferred embodiment of the present invention will effectively provide a battery that essentially never discharges, whose life remains at 100% when AC power is accessed. To the extent that a combined AC/DC adapter and battery pack in a single detachable housing may be larger than a conventional battery pack, perhaps necessitating a laptop or notebook of generally larger size, it should be appreciated that many users may well be willing to accept this as a bearable tradeoff for greatly increased battery life. Further, this is readily accomplished with much greater convenience than would be the case with having to carry a separate "brick" that is not part of an integral battery pack unit; the awkward, bulky "brick" no longer has to be lugged around.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
a main housing;
a main memory disposed within said main housing;
a system processor disposed within said main housing;

a power pack for providing power to said main memory and said system processor;

said power pack being selectively removable from and integrable with said main housing;

said power pack comprising:
  a power pack housing;
  a battery pack; and
  an AC/DC adapter;
  said battery pack and said AC/DC adapter both being housed within said power pack housing;

said apparatus further comprising:

a charge control arrangement;

said power pack further comprising:
  a first connection for interconnecting said charge control arrangement with said AC/DC adapter; and
  a second connection for interconnecting said charge control arrangement with said battery pack;
  said first and second connections being separate from one another.

2. The apparatus according to claim 1, wherein said AC/DC converter comprises a connection to an AC power source.

3. The apparatus according to claim 1, further comprising an input for accommodating a second AC/DC adapter, the second AC/DC adapter being separate from said power pack.

4. The apparatus according to claim 1, wherein said battery pack comprises a battery management unit and battery cells.

5. The apparatus according to claim 4, wherein said second connection acts to interconnect said charge control arrangement with said battery management unit.

6. The apparatus according to claim 1, wherein:
  said AC/DC adapter is a first AC/DC adapter;
  said apparatus further comprises an input for accommodating a second AC/DC adapter, the second AC/DC adapter being separate from said power pack.

7. The apparatus according to claim 6, further comprising a control circuit for managing power from said input and from said first AC/DC adapter.

8. The apparatus according to claim 7, wherein said control circuit acts to:
  admit power from said first AC/DC adapter when said power pack is integrated with said main housing and when said input does not accommodate the second AC/DC adapter; and
  admit power from the second AC/DC adapter when the second AC/DC adapter is accommodated at said input.

9. The apparatus according to claim 1, wherein said battery pack comprises a battery management unit and battery cells.

10. The apparatus according to claim 1, wherein said power pack is selectively insertable into said main housing.

11. The apparatus according to claim 4, wherein said apparatus comprises a laptop computer.

12. An apparatus comprising:
  a power pack for providing power to a laptop computer;
  said power pack being selectively removable from and integrable with a laptop computer housing;
  said power pack comprising:
    a power pack housing;
    a battery pack; and
    an AC/DC adapter;
    said battery pack and said AC/DC adapter both being housed within said power pack housing
  wherein said power pack further comprises:
  a first connection for interconnecting a laptop computer charge control arrangement with said AC/DC adapter; and
  a second connection for interconnecting the laptop computer charge control arrangement with said battery pack;
  said first and second connections being separate from one another;
  wherein said battery pack comprises a battery management unit and battery cells; and
  wherein said second connection acts to interconnect the laptop computer charge control arrangement with said battery management unit.

13. An apparatus comprising:
  a main housing;
  a main memory disposed within said main housing;
  a system processor disposed within said main housing;
  a power pack for providing power to said main memory and said system processor;
  said power pack being selectively removable from and integrable with said main housing;
  said power pack comprising:
    a power pack housing;
    a battery pack; and
    an AC/DC adapter;
    said battery pack and said AC/DC adapter both being housed within said power pack housing;
  said apparatus further comprising an input for accommodating a second AC/DC adapter, the second AC/DC adapter being separate from said power pack.

* * * * *